United States Patent [19]
O'Neil

[11] Patent Number: 5,323,539
[45] Date of Patent: Jun. 28, 1994

[54] PLUMB BOB REEL

[76] Inventor: Michael J. O'Neil, 300 Verdon Way, Culpeper, Va. 22701

[21] Appl. No.: 74,298

[22] Filed: Jun. 9, 1993

Related U.S. Application Data

[63] Continuation-in-part of Ser. No. 56,832, May 3, 1993.

[51] Int. Cl.$^5$ .............................................. G01C 15/10
[52] U.S. Cl. .......................................... 33/394; 33/392
[58] Field of Search ........................... 33/392, 393, 394

[56] References Cited
U.S. PATENT DOCUMENTS

| | | | |
|---|---|---|---|
| 1,230,074 | 6/1917 | Perkins | 33/393 |
| 1,571,687 | 2/1926 | O'Loughlin | 33/394 |
| 2,384,914 | 9/1945 | Hoagland | 33/393 |
| 2,545,321 | 3/1951 | Tumminello | 33/393 |
| 2,637,913 | 5/1953 | Williams | 33/393 |
| 3,016,616 | 1/1962 | Matson | 33/393 |
| 3,172,205 | 1/1962 | Gammon | 33/393 |
| 3,478,438 | 11/1969 | Lazar | 33/394 |
| 4,442,610 | 4/1984 | Owens, Jr. | 33/392 |

FOREIGN PATENT DOCUMENTS

| | | | |
|---|---|---|---|
| 2292217 | 7/1976 | France | 33/393 |
| 2424516 | 12/1979 | France | 33/393 |
| 0282416 | 11/1989 | Japan | 33/393 |
| 0389257 | 7/1965 | Switzerland | 33/394 |

*Primary Examiner*—Thomas B. Will
*Attorney, Agent, or Firm*—George R. McGuire

[57] ABSTRACT

A plumb bob reel capable of retracting, housing, and protecting the entire length of flexible line which is attached to a plumb bob. The reel is generally comprised of a reel housing having a line retaining spool rotatably mounted therein, and a spring retraction member cooperatively positioned with respect to the spool. Further features of the reel include a protruding section which cooperatively receives a specially designed plumb bob, and two ways for accurately guiding and holding the flexible line in vertically aligned relation above a predetermined datum. The two ways of aligning the line are comprised of a knobbed member fixedly attached to the front wall of the housing, and a plurality of longitudinally formed, contiguous grooves through which the flexible line may pass. In addition, the reel is equipped with ways for securely attaching the housing to either ferrous or non-ferrous structures.

3 Claims, 8 Drawing Sheets

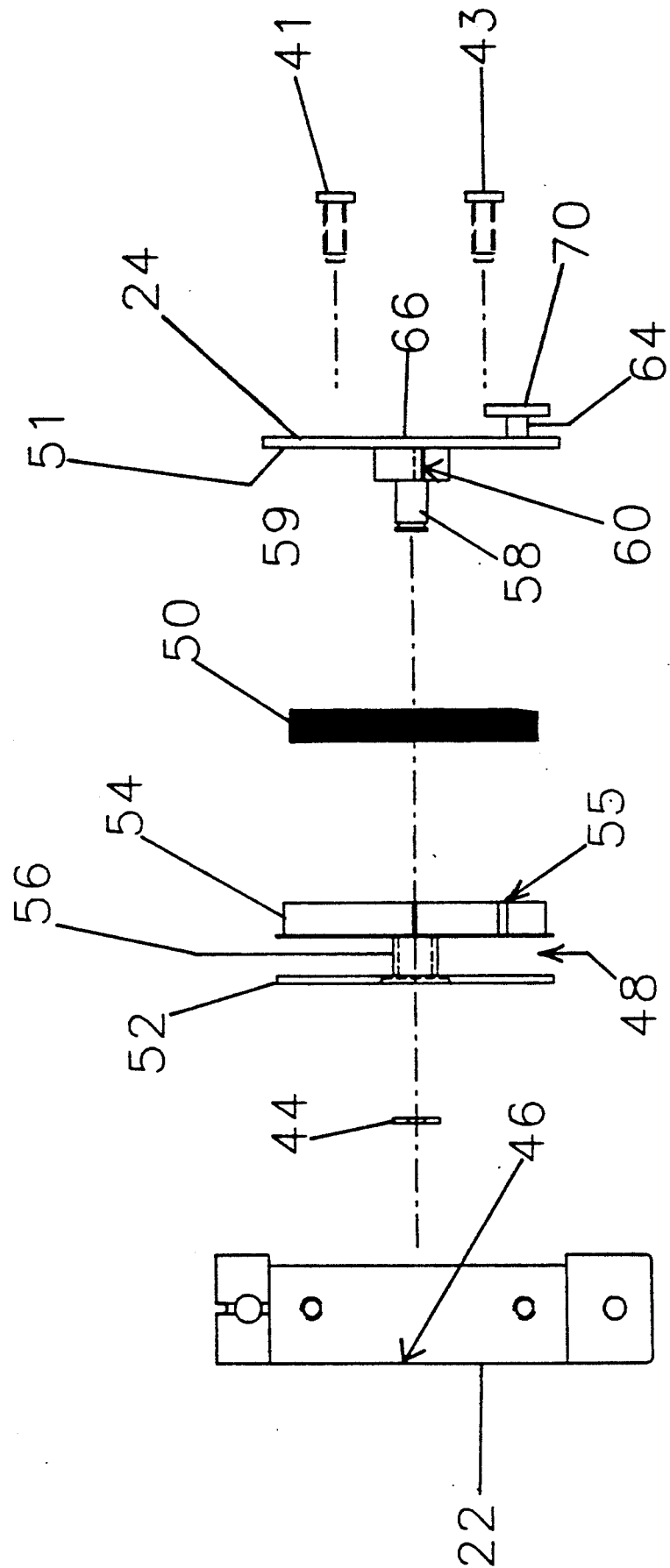

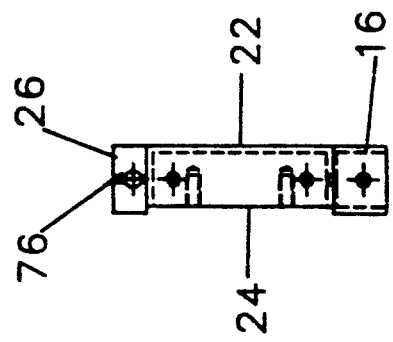
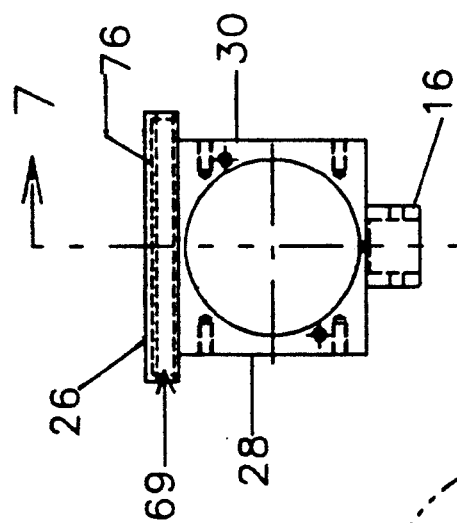
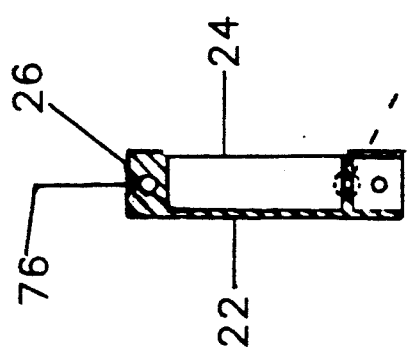
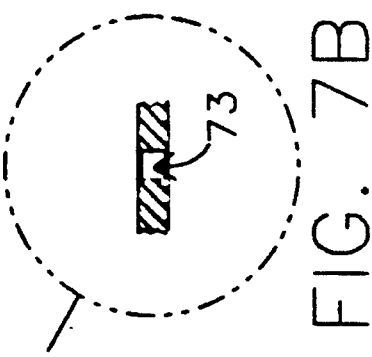
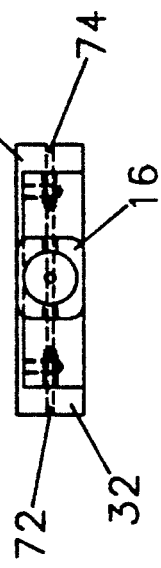

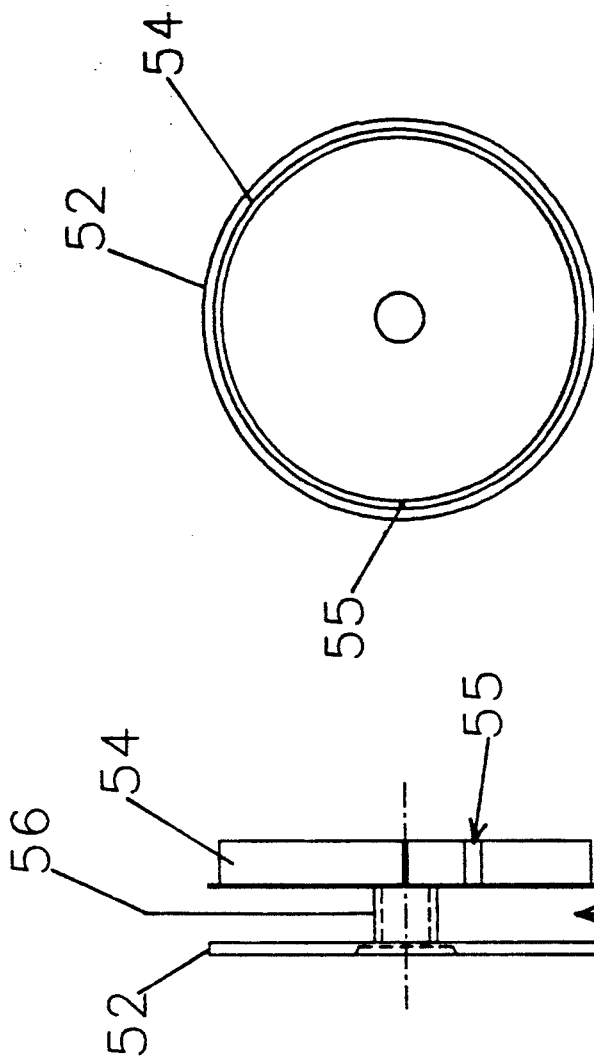
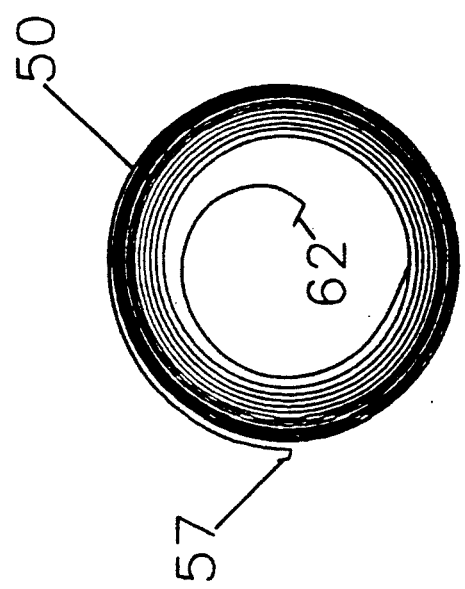
FIG. 14
FIG. 15
FIG. 16

PLUMB BOB REEL

REFERENCE TO RELATED APPLICATION

The present application is a continuation-in-part of applicant's co-pending application, Ser. No. 08/56,832, filed May 3, 1993 pending.

BACKGROUND OF THE INVENTION

The present invention broadly relates to tools used in the construction and surveying industries and, more specifically, to reels for use in combination with plumb bobs. The present invention further relates to reels which fully retract and protect flexible plumb bob lines.

In surveying and construction, it is quite often necessary to establish a point, or set of points, which vertically, or laterally, align with a preexisting point (datum). To accurately establish these point(s), a tool termed a plumb bob is commonly employed. A plumb bob is basically comprised of an elongated, frusto-conically shaped, weighted member attached to one end of a flexible line (i.e., string). In practice, it is typical for a worker to hold the free end of the flexible line in vertically aligned relation above a predetermined datum such that the plumb bob is suspended slightly above the datum. The worker may, of course, adjust the positioning of the plumb bob until it becomes vertically aligned with the predetermined datum. The flexible line then becomes a vertical extension of this datum, thereby providing surveyors, and other workers who may have an obstructed view of the actual datum, with the ability to focus in on the line and make accurate lateral alignments from the datum.

In traditional plumb bobs, there are no means of housing and protecting the flexible line attached thereto. Therefore, the line is constantly being cut due to the chafing and slicing caused through contact with other tools and foreign objects. When breakage of the line occurs on the worksite, work must come to a halt until the line is replaced. If extra line was not brought to the particular location on the worksite where work was being done at the time of the breakage, an extraordinary amount of time, and therefore money, is lost until new line is found and attached to the plumb bob.

U.S. Pat. No. 3,172,205 to Gammon attempts to correct the above-identified problem by providing a reel which protects the line by retracting it into a housing when the plumb bob is not in use. The Gammon reel does protect the majority of line, but fails to adequately protect the portion of the line immediately adjacent the top surface of the plumb bob. This causes that particular portion of the line to fray and eventually break, thereby necessitating cutting a small portion of the line and retying the remaining line to the plumb bob. Due to the positioning and cooperation of the spool and line retraction mechanism, only a short amount of line can be stored on the spool and protected within the reel housing. Therefore, after the line breaks a few times, it becomes too short to be of any value, thereby rendering the reel useless.

A second problematic area which exists in this art, and has yet to be adequately addressed in the prior art is that of attaching the flexible line to a conveniently positioned structure, thereby permitting the plumb bob to dangle above a predetermined datum for an extended period of time. It is quite often necessary for a plurality of laterally aligned points to be constructed from a single datum. Therefore, after a surveyor has marked one point, he must move the transit to the next location where a mark needs to be established. Since this transfer of location takes a considerable amount of time, in order to maintain maximum consistency, the worker holding the plumb bob must remain motionless. In this situation it would be beneficial to have a feature which permits the attachment of the line to a conveniently placed structure. This feature could also be utilized in another scenario, such as in the construction of a door jamb, where the work area is confined to a small area and two workers are needed to make a set of points vertically and laterally aligned with a datum. By attaching the line to a conveniently placed structure, the second worker could be eliminated, thereby saving time and manpower.

U.S. Pat. No. 4,442,610 to Owens, Jr. provides a plumb bob holding device which is capable of being magnetically attached to any ferrous object. This attachment device is completely separate from the plumb bob and line, therefore the free end of the line must be tied to it every time it is utilized. Furthermore, since the sole means of attachment are magnetic, it is incapable of attaching to any non-ferrous object.

OBJECTS AND ADVANTAGES OF THE PRESENT INVENTION

It is therefore a principal object of the present invention to provide a plumb bob reel which retracts, houses, and protects the entire length of flexible line when the plumb bob is not in use.

It is a further object of the present invention to provide a plumb bob reel which is easily attachable to any object.

Other objects and advantages of the present invention will in part be obvious, and in part appear hereinafter.

SUMMARY OF THE INVENTION

In accordance with the foregoing objects and advantages, the present invention provides a plumb bob reel capable of retracting, housing, and protecting the entire length of flexible line attached to a plumb bob. The reel is generally comprised of a reel housing, and a conventional spool and spring retraction mechanism securely held within the housing. Further features of the reel include a protruding section which cooperatively receives a plumb bob of the type disclosed in applicant's co-pending application, Ser. No. 08/56,832, means for attaching the housing to a cooperatively positioned edifice, and means for accurately guiding and holding the flexible line in vertically aligned relation above a predetermined datum.

The reel housing is generally rectangular in all horizontal and vertical cross-sectional planes and includes front and rear planar sides held in spaced, parallel relation to one another by top, bottom and side surfaces. The two side surfaces comprise elongated magnets which permit removable attachment of the reel to any ferrous object. The two magnets and the top surface each include a respective longitudinal groove formed therein which cooperatively align with one another, thereby forming a contiguous channel through which the flexible line may pass. When the reel is attached to an overhead structure, passage of the line through the channel provides an accurate alignment of the line with respect to a predetermined datum.

The top surface of the reel housing includes a longitudinal passage, or hole, which permits a nail to pass therethrough and removably attach the reel to a penetrable sidewall structure. When attached to a sidewall structure, the flexible line may be guided over a friction knob which is fixedly attached to the outwardly facing surface of the front side of the housing. The knob is positioned adjacent the bottom surface of the housing and has one edge vertically aligned with the centrally positioned aperture formed in the bottom surface through which the flexible line exits the housing. The positioning of the knob ensures maximum accuracy when aligning the flexible line (and plumb bob) with a datum.

The flexible line is wound upon the conventional spool which is rotatably mounted within the reel housing. A coiled spring retraction member has one end fixedly connected to the rotatable spool, and its other end fixedly attached to the inwardly facing surface of the front side of the reel. Therefore, as the flexible line is withdrawn from the housing, the spring retraction member uncoils, thereby producing an equal and opposite recoiling force. This recoiling force causes the flexible line to retract back onto the spool, unless, of course, the line is pulled outwardly with a force greater than the recoiling force of the spring. The friction which exists between the line and the housing, when the line is guided through the channels, or is wrapped around the friction knob in combination with the force of gravity acting on the plumb bob is substantially equal to the recoiling force, thereby causing the plumb bob and line to be stationarily suspended at a desired length from the reel housing. If the plumb bob and line were left to freely hang from the reel, the force of gravity would supersede the recoiling force thereby pulling the line out until the plumb bob becomes static on the floor.

BRIEF DESCRIPTION OF THE DRAWING FIGURES

FIG. 4 is an exploded, side elevational view of the plumb bob reel of FIG. 1 showing all the internal elements thereof in spaced, sequential relation to one another;

FIG. 5 is a side elevational view of the housing of the plumb bob reel of FIG. 1;

FIG. 6 is a front elevational view of the plumb bob reel housing of FIG. 5;

FIG. 7A is a cross-sectional view of the plumb bob reel housing taken along section line 7—7 of FIG. 6;

FIG. 7B is an enlarged view of the indicated portion of FIG. 7A;

FIG. 8 is a bottom plan view of the plumb bob reel housing of FIG. 5;

FIG. 14 is a front elevational view of a spool assembly;

FIG. 15 is a side elevational view of the spool assembly of FIG. 14;

FIG. 16 is a front elevational view of a spring;

DETAILED DESCRIPTION OF THE PREFERRED EMBODIMENT

Figure 1:
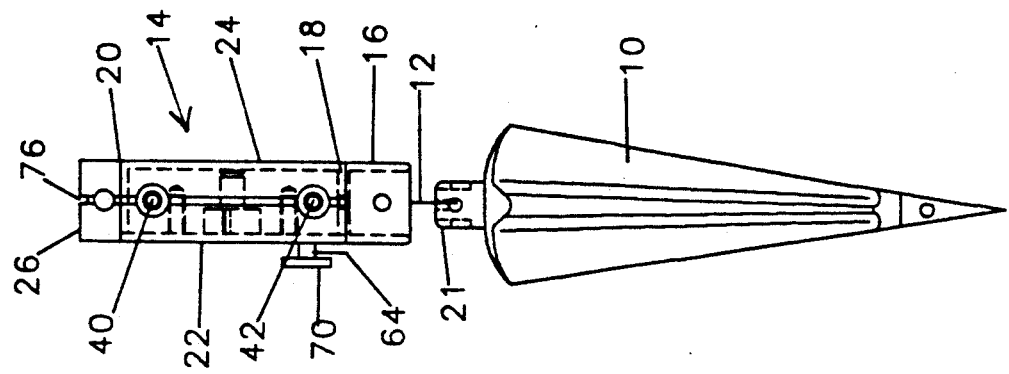
FIG. 1 is a side elevational view of a plumb bob held in spaced relation to the plumb bob reel of the present invention.
Figure 2:
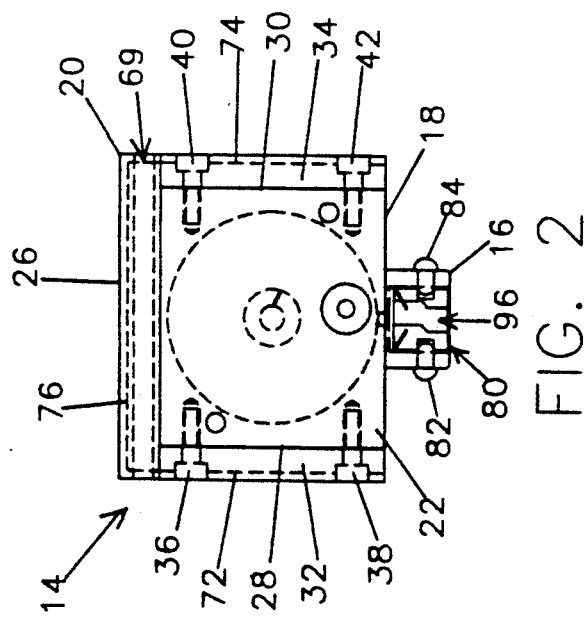
FIG. 2 is a front elevational view of the plumb bob reel of FIG. 1 and showing the internal features thereof.
Figure 3:
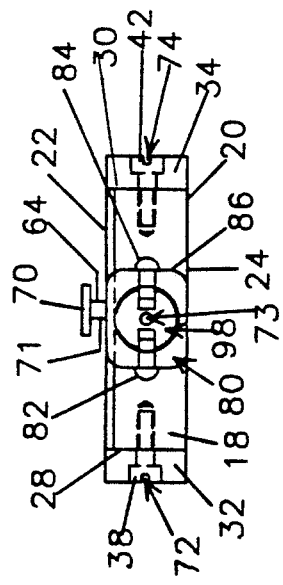
FIG. 3 is a bottom plan view of the plumb bob reel of FIG. 1.

Referring now to the drawing figures, there is seen in FIG. 1 a plumb bob 10 suspended by a flexible line 12 from a reel, generally denoted by reference numeral 14. Line 12 is seen to be extending outwardly from reel 14 through a plumb bob receiving section 16 which integrally protrudes from the bottom surface 18 of reel 14.

Reel 14 is comprised of two main sections, namely, plumb bob receiving section 16 and reel housing 20. Reel housing 20 contains all of the movable elements of reel 14 while plumb bob receiving section 16 operably receives the specially designed knobbed portion 21 of plumb bob 10. Specially designed plumb bob 10 is the subject of applicant's co-pending patent application, Ser. No. 08/56,832. Therefore, plumb bob 10 will not be discussed in great detail here, and will only be explained in the terms which help better understand its cooperative relation to reel 14.

Figure 10:
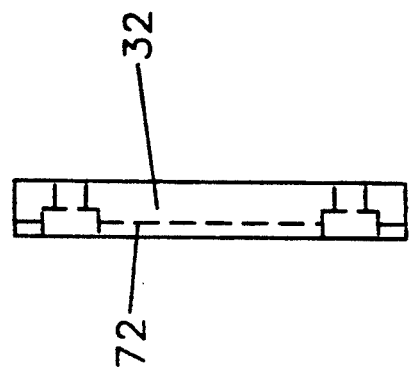
FIG. 10 is a side elevational view of the magnet of FIG. 9.
Figure 11:
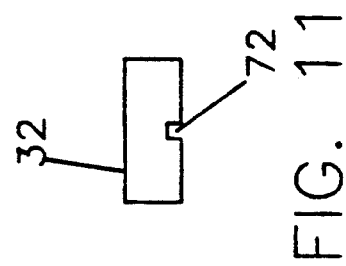
FIG. 11 is a top plan view of the magnet of FIG. 9.
Figure 9:
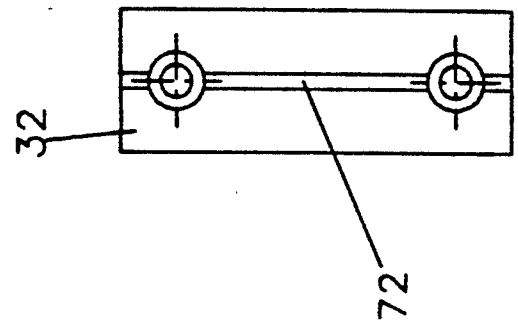
FIG. 9 is a front elevational view of a magnet which is removably attached to the side of the plumb bob reel housing of FIG. 5.

More specifically, reel housing 20 includes rear and front planar walls 22 and 24, respectively, held in spaced, parallel relation to one another by narrower, planar, top, bottom and two side members 26, 18, 28 and 30, respectively. Although housing 20 is shown as having four distinct members 18, 26, 28 and 30, the four members could certainly be integrally formed as one continuous member. A pair of magnets 32 and 34 (the details of which can be seen more clearly in FIGS. 9-11 and will be discussed further on in the specification) are of a width and length substantially identical to side members 28 and 30, and are respectively, fixedly attached thereto by first and second pairs of vertically aligned screws 36, 38, and 40, 42, respectively. When magnets 32 and 34 are attached to side members 28 and 30, the outline of reel housing 20 is substantially rectangular when viewed from any elevational or plan view.

As seen most clearly in FIG. 4, front wall 24 may be detached from reel housing 20 by removing screws 41 and 43, thus providing access to all of the internal elements held within the cavity defined by housing 20. These internal elements include a snap ring 44 fixedly attached to the inwardly facing surface 46 of rear wall 22, a rotatably mounted spool denoted generally by reference numeral 48, upon which flexible line 12 is wound, and a spring retraction mechanism 50 positioned adjacently between spool 48 and the inwardly facing surface 51 of front wall 24.

Spool 48 includes a pair of round, planar, outer plates 52 and 54 held in spaced, parallel relation to one another by a cylindrically shaped drum 56. Plate 54 is thicker than plate 52, includes a slit 55 transversely formed therein, and is oriented between plate 52 and front wall 24. The substantial thickness of plate 54 permits spring retraction mechanism 50 to sit thereupon with first end 57 of spring mechanism 50 securely held in slit 55, thereby permitting spring mechanism 50 to rotate along with spool 48. Plates 52 and 54, and drum 56 each include axially aligned apertures centrally formed therethrough, and through which passes a first boss 58 integrally extending from a substantially larger second boss 59 which integrally extends from the inwardly facing surface 51 of front wall 24. After passing through spool 48, boss 58 lockingly engages snap ring 44, thereby securely attaching front wall 24 to the rest of housing 20 and permitting spool 48 to freely rotate within housing 20.

Second boss 59 abuts plate 54 and includes a slit 60 transversely formed therein. Second end 62 of spring mechanism 50 securely sits within slit 60, thereby permitting a portion of spring mechanism 50 to maintain a static relationship with respect to housing 20. Since first end 57 of spring mechanism 50 rotates along with spool 48 and second end 62 remains stationary, as flexible line 12 is withdrawn from reel 14 spring retraction member 50 becomes compressed. Therefore, according to Newton's third law of motion, spring mechanism 50 will produce a decompression force (i.e., recoiling force) equal to the compression force. This, of course, causes spring mechanism 50 to recoil, thereby pulling flexible line 12 back into housing 20. If it is desired to maintain flexible line 12 outside of housing 20, a force at least as great as the decompression, or recoiling, force must be induced on line 12.

Figure 12:
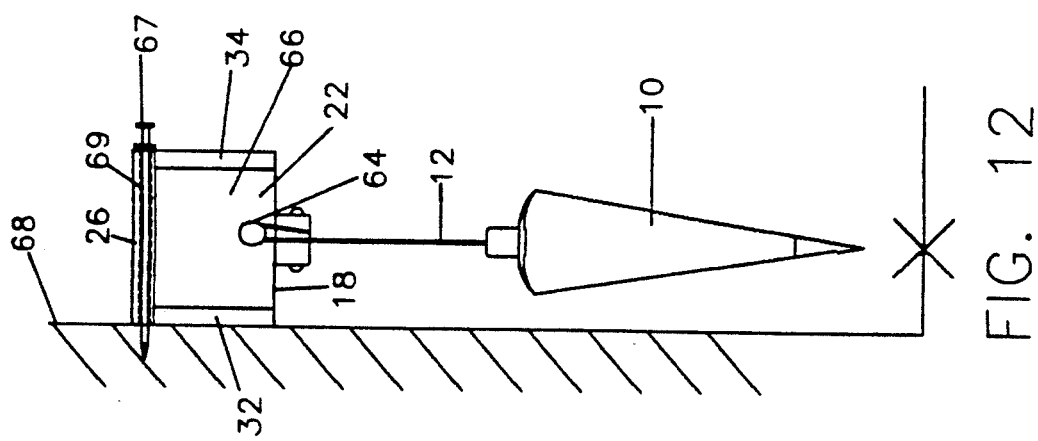
FIG. 12 is a front elevational view of a plumb bob suspended from the reel of FIG. 1 which is attached to a sidewall.
Figure 18:
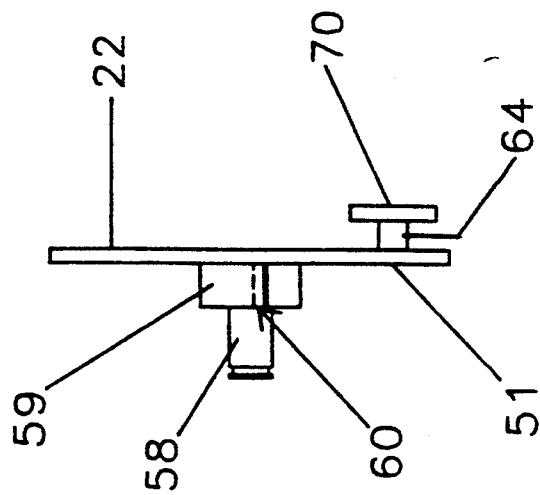
FIG. 18 is a side elevational view of the cover plate assembly of FIG. 17.
Figure 17:
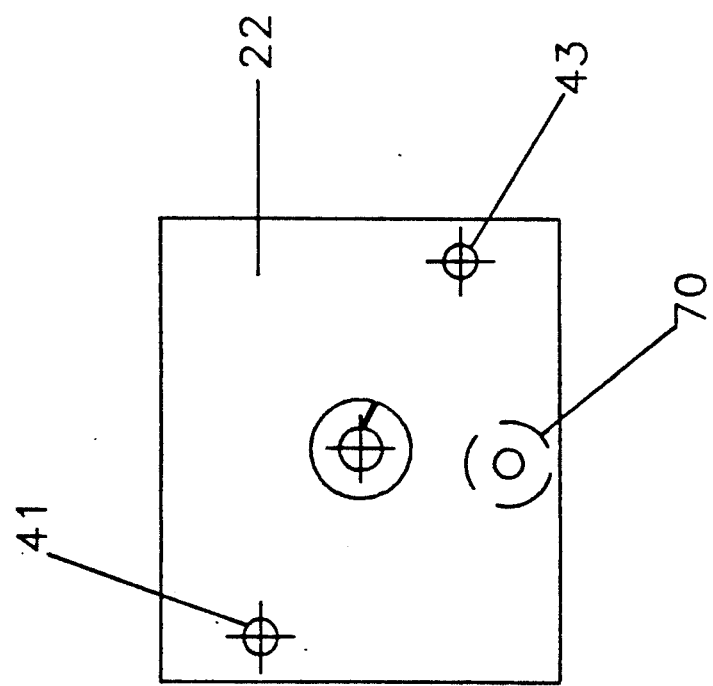
FIG. 17 is a front elevational view of a cover plate assembly.
Figure 20:
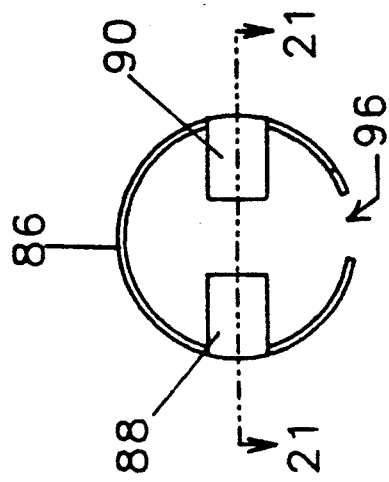
FIG. 20 is a top plan view of the spring clip assembly of FIG. 19.

Two separate means are provided to maintain the force necessary to hold line 12 outside of housing 20. The first means, as seen in FIG. 12, is comprised of a knob 64 integrally extending from the outwardly facing surface 66 of front wall 24. Knob 64 is utilized when a worker is simply holding plumb bob 10 in vertically aligned relation above a predetermined datum, or when housing 20 is attached to a sidewall 68 by either of magnets 32 and 34, or by a nail 67 passing through a hole 69 longitudinally formed through top member 26. Wrapping line 12 around knob 64 prevents the recoiling force of spring mechanism 50 from retracting line 12 back into housing 20. In addition, knob 64 includes a head portion 70 positioned in spaced relation to front wall 24 to ensure that line 12 won't slip off knob 64. Furthermore, edge 71 of knob 64 is vertically aligned with opening 73 (seen most clearly in FIG. 7B) through which line 12 passes, thereby ensuring maximum accuracy when aligning plumb bob 10 above a predetermined datum.

Figure 13:
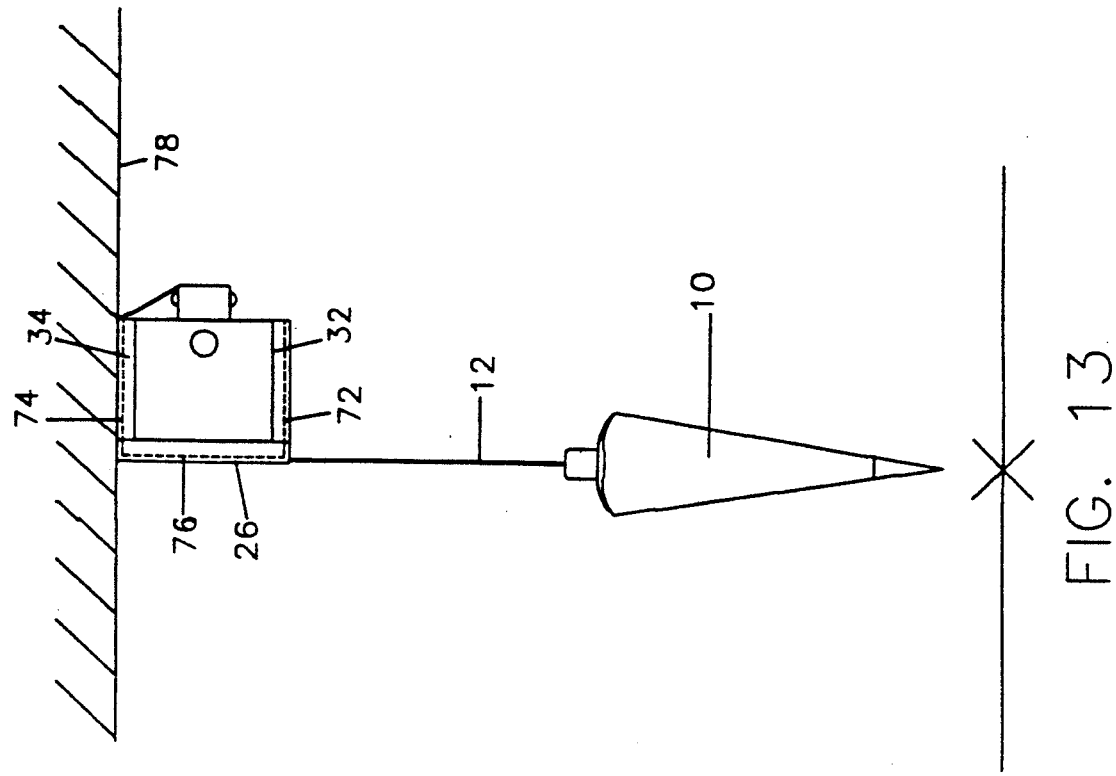
FIG. 13 is a front elevational view of a plumb bob suspended from the reel of FIG. 1 which is attached to an overhead structure.

The second means for holding line 12 outside of housing 20 includes a series of channels 72, 74, and 76 contiguously, longitudinally extending along magnets 32 and 34 and top surface 26, respectively. As best seen in FIG. 13, channels 72, 74 and 76 are utilized when reel 14 is attached to an overhead structure 78. Between the force of gravity acting on plumb bob 10 and the frictional force between line 12 and grooves 72, 74, and 76, line 12 remains stationarily suspended from reel 12 until another force displaces it.

Figure 22:
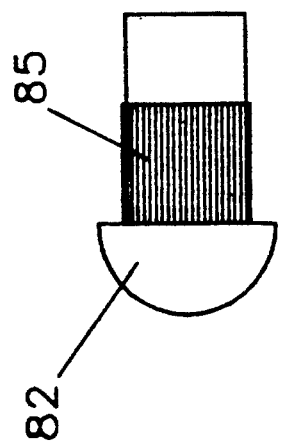
FIG. 22 is a side elevational view of a push pin.
Figure 19:
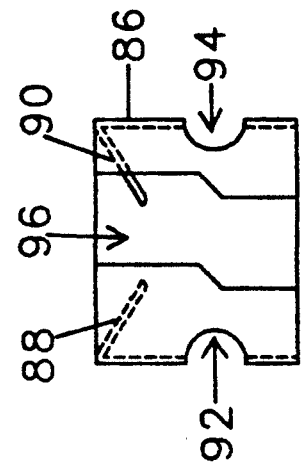
FIG. 19 is a front elevational view of a spring clip assembly.
Figure 21:
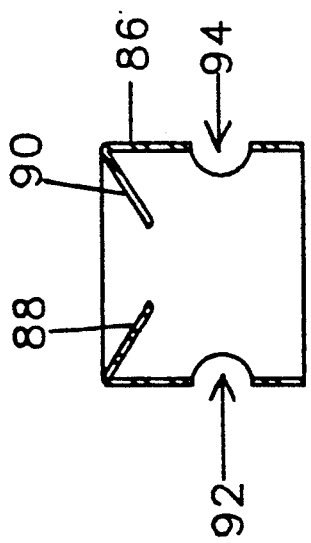
FIG. 21 is a cross-sectional view of the spring clip assembly taken along section line 21—21 of FIG. 20.

As previously mentioned, plumb bob receiving section 16 protrudes from bottom surface 18 of housing 14. Receiving section 16 permits specially designed knobbed portion 21 of plumb bob 10 to be securely, yet releasably, positioned within receiving section 16. Receiving section 16 includes an open area 80 large enough to receive knobbed portion 21, a pair of diametrically opposed, hardened steel pins 82 and 84 radially extending therethrough, and a body 86 having an annular sidewall, and a pair of diametrically opposed, resilient spring clips 88 and 90 extending from the top end thereof, securely positioned therein. More specifically, as seen in FIG. 22 hardened steel pins 82 and 84 include a knurled portion 85 which provide a secure engagement of receiving section 16. Body 86 includes a pair of diametrically opposed apertures 92 and 94 formed therethrough, and a longitudinally formed slit 96. Slit 96 permits the two, distinct halves of spring clip body 86 to be pinched inwardly together so as to fit into open area 80. When fully inserted within open area 80, body 62 may be released and twisted until steel pins 82 and 84 engage apertures 92 and 94. Once pins 82 and 84 engage apertures 92 and 94, body 86 springs outwardly to its original shape, thereby securely fixing itself within receiving section 16. The annular sidewall of body 86 defines a cylindrical passage 98 which is sufficiently large to permit the insertion of knobbed portion 21 therein. Aperture 73, through which flexible line 12 passes, provides open communication between housing 20 and receiving portion 16.

Knobbed portion 21 includes mean for lockingly engaging itself within receiving section 16, applicant's co-pending application, Ser. No. 08/56,832, and serve no notable significance to the disclosure of this application and will therefore be discussed in no greater detail.

What is claimed is:

1. An improved plumb bob reel of the type including a housing having first and second opposed, planar walls held in spaced, parallel relation to one another by longitudinally elongated bottom, top and two side planar members, said bottom and top planar members, and said two side planar members respectively extending in parallel relation to one another; a spool rotatably positioned within said housing; a predetermined length of flexible line for extension from and wound retraction upon said spool; an aperture formed substantially centrally through said bottom planar member, said flexible line freely passing through said aperture for purposes of becoming suspended in vertical alignment above a predetermined datum; and a spring retraction mechanism positioned within said housing for retracting said line upon said spool, wherein the improvements comprise:
   a) first and second longitudinally elongated magnets respectively, removably attachable to said two side planar members wherein said first and second magnets permit removable attachment of said reel to any ferrous object;
   b) first, second, and third elongated channels respectively formed in said first and second magnets and said top planar member, said first, second, and third channels extending in longitudinal relation with respect to said longitudinal axis of said first and second magnets and said top planar member and extending in longitudinally aligned relation to each other, whereby said flexible line may be guided through said channel and suspended in vertically aligned relation above said predetermined datum;
   c) said spool including first and second plates held in spaced, parallel relation by a drum, said first and second plates each having respective, distinct widths, wherein said first plate's width is substantially greater than said second plates' width;

d) said spring retraction mechanism having first and second ends and being coiled externally upon said first plate of said spool;

e) a knobbed member extending outwardly from one of said first and second planar walls, whereby said flexible line may be wrapped around said knobbed member and suspended in vertically aligned relation above said predetermined datum; and f) means for attaching said reel to a penetrable object.

2. The invention according to claim 1 wherein said knobbed member is positioned adjacent said bottom planar member and includes one edge positioned in vertically aligned relation above said aperture.

3. The invention according to claim 1 wherein said means for attaching said reel to a penetrable object comprises:

a) a hole formed longitudinally through said reel housing adjacent and parallel to said top planar member; and b) an elongated staked member extending through said hole.

* * * * *